(12) United States Patent
Sakata (10) Patent No.: US 7,353,098 B2
(45) Date of Patent: Apr. 1, 2008

(54) ROLL-OVER SUPPRESSING CONTROL APPARATUS FOR A VEHICLE

(75) Inventor: Kunio Sakata, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 129 days.

(21) Appl. No.: 11/073,856

(22) Filed: Mar. 8, 2005

(65) Prior Publication Data
US 2005/0216163 A1    Sep. 29, 2005

(30) Foreign Application Priority Data
Mar. 25, 2004    (JP) ............... 2004-090281

(51) Int. Cl.
*B60G 17/016*    (2006.01)
*B60T 8/24*    (2006.01)
(52) U.S. Cl. .............. 701/38; 701/48; 701/72
(58) Field of Classification Search .......... 701/1, 701/70, 36, 37, 38, 41, 45, 46, 48, 72; 340/429, 340/440
See application file for complete search history.

(56) References Cited

U.S. PATENT DOCUMENTS

| | | | | |
|---|---|---|---|---|
| 5,822,709 A * | 10/1998 | Fujita | ............... | 701/70 |
| 6,081,761 A * | 6/2000 | Harada et al. | ............... | 701/72 |
| 6,292,734 B1 * | 9/2001 | Murakami et al. | ........... | 701/84 |
| 6,954,140 B2 * | 10/2005 | Holler | ............... | 340/438 |
| 7,142,969 B2 * | 11/2006 | Inagaki | ............... | 701/70 |
| 2002/0087247 A1 * | 7/2002 | Tanaka et al. | ............... | 701/70 |
| 2004/0216020 A1 | 10/2004 | Stiller | | |
| 2004/0236490 A1 * | 11/2004 | Kin | ............... | 701/70 |
| 2004/0267427 A1 * | 12/2004 | Suzuki et al. | ............... | 701/69 |
| 2005/0131604 A1 * | 6/2005 | Lu | ............... | 701/38 |

FOREIGN PATENT DOCUMENTS

| | | |
|---|---|---|
| DE | 103 18 111 | 11/2004 |
| JP | 10 24819 | 1/1998 |
| JP | 2000 104582 | 4/2000 |

* cited by examiner

*Primary Examiner*—Jack Keith
*Assistant Examiner*—Edward Pipala
(74) *Attorney, Agent, or Firm*—Jacobson Holman PLLC (57) ABSTRACT

The invention provides a roll-over suppressing control apparatus for a vehicle which can suppress overturning of the vehicle while securing the traveling performance of the vehicle through appropriate slowing down control. The roll-over suppressing control apparatus for a vehicle includes a braking means capable of braking a wheel of the vehicle, an engine output adjustment means capable of controlling output power of an engine, a roll rate detection means for detecting a roll rate of the vehicle, a lateral acceleration detection means for detecting a lateral acceleration of the vehicle, and a roll-over suppressing control means for causing the braking means and the engine output adjustment means to apply braking and suppress the output power, respectively, if a first control carrying out condition based on a value of the roll rate is satisfied upon turning of the vehicle and for causing the braking means to apply braking when a second control carrying out condition based on a value of the lateral acceleration is satisfied upon turning of the vehicle.

8 Claims, 6 Drawing Sheets

UPON LEFT TURNING

BRAKING FORCE BY ROLL RATE CONTROL + BRAKING FORCE BY LATERAL ACCELERATION CONTROL → BRAKING FORCE BY INTEGRATED CONTROL

FIG. 5(b)

UPON RIGHT TURNING

BRAKING FORCE BY ROLL RATE CONTROL + BRAKING FORCE BY LATERAL ACCELERATION CONTROL → BRAKING FORCE BY INTEGRATED CONTROL

FIG. 6(a)

CARRY OUT ROLL-OVER
SUPPRESSING CONTROL
(ROLL RATE CONTROL +
ENGINE CONTROL)

NO ROLL-OVER
SUPPRESSING CONTROL

LATERAL ACCELERATION: LOW
ROLL RATE: HIGH

UPON NON-STEADY TURNING

FIG. 6(b)

CARRY OUT ROLL-OVER
SUPPRESSING CONTROL
(LATERAL ACCELERATION CONTROL)

NO ROLL-OVER
SUPPRESSING CONTROL

LATERAL ACCELERATION: HIGH
ROLL RATE: LOW

UPON STEADY TURNING

ROLL-OVER SUPPRESSING CONTROL APPARATUS FOR A VEHICLE

BACKGROUND OF THE INVENTION (1) Field of the Invention

This invention relates to a roll-over suppressing control apparatus for a vehicle for suppressing overturning of the vehicle while the traveling performance of the vehicle is secured.

(2) Description of the Related Art

When a vehicle turns, depending upon the traveling speed or the steering situation of the vehicle, a moment in the rolling direction is generated on the vehicle and sometimes degrades the stability of the vehicle. In such an instance, if the moment in the rolling direction increases excessively, then there is the possibility that the vehicle may be placed into roll-over (overturning). Therefore, various control apparatus have been proposed conventionally which take a braking step before the vehicle is placed into roll-over.

For example, Japanese Patent Laid-Open No. 2000-104582 (hereinafter referred to as Patent Document 1) discloses a vehicle behavior control apparatus having such a configuration that, if it is decided that the vehicle behavior is unstable, then fuel supply to an engine is blocked and, after the vehicle behavior is placed back into a stable state, the fuel supply to the engine is re-started in response to the value of the lateral acceleration (lateral G) of the vehicle. According to the configuration, in a state wherein the vehicle behavior is unstable, the engine torque is reduced so that the wheels may grip the road surface well, and after the vehicle is placed back into a stable state, the control of reducing the engine torque is ended in response to the value of the lateral acceleration of the vehicle to restore a stable state wherein no hunting of the control occurs.

While the technique disclosed in Patent Document 1 takes a braking step of reducing the propelling force of the vehicle through control of the engine torque to suppress the vehicle speed, also another technique of applying braking force to the wheels to brake the vehicle has been proposed.

For example, Japanese Patent Laid-Open No. Hei 10-24819 (hereinafter referred to as Patent Document 2) discloses a braking force control apparatus having such a configuration that it includes a first control mode wherein it controls the vehicle behavior based on a turning characteristic (magnitude of the yaw rate) of the vehicle and a second control mode wherein rolling (overturning) is controlled based on an excessive roll index (lightness or decreasing speed of the load to a wheel) of the vehicle. In the first control mode, a difference in braking force is provided between turning inner wheels and turning outer wheels to control the yaw moment of the vehicle in the turning direction or turning round direction, but in the second control mode, braking force is applied to the wheels and the fuel amount to be supplied to the engine is reduced to control the vehicle speed. According to the configuration, when the vehicle is in the first control mode, recovery of the vehicle behavior can be achieved, and when the vehicle is in the second control mode, the centrifugal force to act upon the center of gravity of the vehicle can be reduced to prevent rolling and the traveling stability can be maintained well.

In this manner, according to the apparatus disclosed in Patent Document 2, in order to prevent rolling of the vehicle, the control of applying braking force to the wheels is carried out simultaneously in addition to the control of decreasing the engine torque disclosed in Patent Document 1.

Incidentally, turning of a vehicle is divided into non-steady (transient) turning upon lane change, emergency avoiding steering and so forth wherein the turning direction is changed over suddenly and steady turning represented by turning along a loop bridge or the like along which turning in the same direction continues.

In the non-steady turning, a high lateral acceleration does not appear immediately after a changeover of the turning direction, but a lateral acceleration appears rather later. However, a roll rate appears immediately after a changeover of the turning direction and generally is less liable to be controlled by the driver. If the roll rate becomes excessively high during such turning, then the vehicle may possibly turn over to its side even if the lateral acceleration remains low.

On the other hand, upon steady turning, a high roll rate does not occur with the vehicle except when the turning behavior of the vehicle changes such as upon starting of turning or upon ending of turning, and the vehicle can be controlled readily by the driver. However, a lateral acceleration in the turning outer side direction normally appears. Then, if the lateral acceleration becomes excessively high during such turning, then the vehicle may possibly turn over to its side even if the roll rate remains low.

Taking notice of such different types of turning of a vehicle as described above, if the control of applying braking force to the wheels as in the technique disclosed in Patent Document 2 and the control of reducing the engine torque are carried out simultaneously, then upon non-steady turning such as upon emergency avoiding turning, the vehicle can be slowed down sufficiently to suppress the roll-over and can be turned safely. However, upon steady turning, since the control of the vehicle during turning by the driver is comparatively easy, the vehicle is sometimes slowed down excessively by the driver. Further, since the engine output power is suppressed, the intention of the driver to raise the vehicle speed or to keep the vehicle speed becomes less likely to be reflected on the vehicle speed, and there is a subject also that the driving feeling is deteriorated.

SUMMARY OF THE INVENTION

It is an object of the present invention to provide a roll-over suppressing control apparatus for a vehicle which can suppress overturning of the vehicle while securing the traveling performance of the vehicle through appropriate slowing down control.

In order to attain the object described above, according to the present invention, there is provided a roll-over suppressing control apparatus for a vehicle, comprising braking means capable of braking a wheel of the vehicle, engine output adjustment means capable of controlling output power of an engine of the vehicle, roll rate detection means for detecting a roll rate of the vehicle, lateral acceleration detection means for detecting a lateral acceleration of the vehicle, and roll-over suppressing control means for causing the braking means and the engine output adjustment means to apply braking and suppress the output power of the engine, respectively, if a first control carrying out condition based on a value of the roll rate detected by the roll rate detection means is satisfied upon turning of the vehicle and for causing the braking means to apply braking when a second control carrying out condition based on a value of the lateral acceleration detected by the lateral acceleration detection means is satisfied upon turning of the vehicle.

With the roll-over suppressing control apparatus having the configuration just described, upon braking control according to the value of the lateral acceleration represented upon steady turning, the stability of the vehicle during turning can be secured while excessive slowing down by suppression of the engine output power is prevented. Further, the control according to the roll rate and the control according to the lateral acceleration can be executed effectively, and the traveling performance and the stability of the vehicle upon turning can be secured irrespective of the difference in the type of turning.

Preferably, when the first control carrying out condition is satisfied, the braking means so as to apply braking force of a first control amount corresponding to the value of the roll rate to the wheel and controls the engine output adjustment means so as to suppress the output power of the engine, but controls, when the second control carrying out condition is satisfied, the braking means so as to apply braking force of a second control amount corresponding to the value of the lateral acceleration to the wheel.

With the roll-over suppressing control apparatus having the configuration just described, since braking force of a magnitude corresponding to the roll rate value or the lateral acceleration value is applied, appropriate braking control according to the degree of stability of the vehicle can be carried out.

Preferably, the roll-over suppressing control means causes the braking means to apply braking force of a sum value of a first correction control amount obtained by multiplying a first control amount corresponding to the value of the roll rate by a roll rate-corresponding gain equal to or lower than 1 and a second correction control amount obtained by multiplying a second control amount corresponding to the value of the lateral acceleration by a lateral acceleration-corresponding gain equal to or lower than 1 to the wheel.

With the roll-over suppressing control apparatus having the configuration just described, even if the control based on the value of the roll rate and the control based on the value of the lateral acceleration are carried out simultaneously, the braking control amount does not become excessively great at all, and the stability of the vehicle can be secured.

Preferably, the roll rate-corresponding gain is set so as to increase as the value of the roll rate increases, and the lateral acceleration-corresponding gain is set so as to increase as the value of the lateral acceleration increases.

With the roll-over suppressing control apparatus having the configuration just described, a braking control amount necessary for stabilization of the vehicle can be secured.

Further preferably, the roll rate-corresponding gain is set such that, when the value of the roll rate is lower than a first predetermined value, the roll rate-corresponding gain has a fixed value equal to or lower than 1, but when the value of the roll rate is equal to or higher than the first predetermined value but is lower than a second predetermined value equal to or higher than the first predetermined value, the roll rate-corresponding gain increases in response to an increase of the value of the roll rate, and when the value of the roll rate is equal to or higher than the second predetermined value, the roll rate-corresponding gain is 1, and the lateral acceleration-corresponding gain is set such that, when the value of the lateral acceleration is lower than a third predetermined value, the lateral acceleration-corresponding gain has a fixed value equal to or lower than 1, but when the value of the lateral acceleration is equal to or higher than the third predetermined value but is lower than a fourth predetermined value equal to or higher than the third predetermined value, the lateral acceleration-corresponding gain increases in response to an increase of the value of the lateral acceleration, and when the value of the lateral acceleration is equal to or higher than the fourth predetermine value, the lateral acceleration-corresponding gain is 1.

With the roll-over suppressing control apparatus having the configuration just described, weighted addition of the braking force values with the magnitudes of the roll rate and the lateral acceleration can be performed appropriately, and a necessary sufficient control amount can be secured for both of the control amount corresponding to the roll rate value and the control amount corresponding to the lateral acceleration.

Preferably, the braking means is provided so as to be capable of braking left and right wheels of the vehicle individually, and the roll-over suppressing control means controls, when a first control carrying out condition is satisfied, the braking means so as to apply braking force of a first control amount corresponding to the valve of the roll rate to a turning outer wheel or wheels and controls the engine output adjustment means so as to suppress the output power of the engine, but controls, when a second control carrying out condition is satisfied, the braking means so as to apply braking force of a second control amount corresponding to the valve of the lateral acceleration to the turning outer wheel or wheels.

With the roll-over suppressing control apparatus having the configuration just described, since, in the roll-over suppressing control, braking force is applied to turning outer wheels upon turning of the vehicle, the vehicle speed can be reduced effectively. Further, a moment in the turning outer side direction can be applied to the vehicle, and consequently, the turning radius can be increased to suppress overturning of the vehicle effectively.

Preferably, the first control carrying out condition includes a condition that the magnitude of the value of the roll rate is equal to or higher than a first control carrying out threshold value set in advance, and the second control carrying out condition includes a condition that the magnitude of the value of the lateral acceleration is equal to or higher than a second control carrying out threshold value set in advance.

With the roll-over suppressing control apparatus having the configuration just described, it is possible to accurately grasp the degree of stability of the vehicle upon turning to carry out the roll-over suppressing control.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 2:
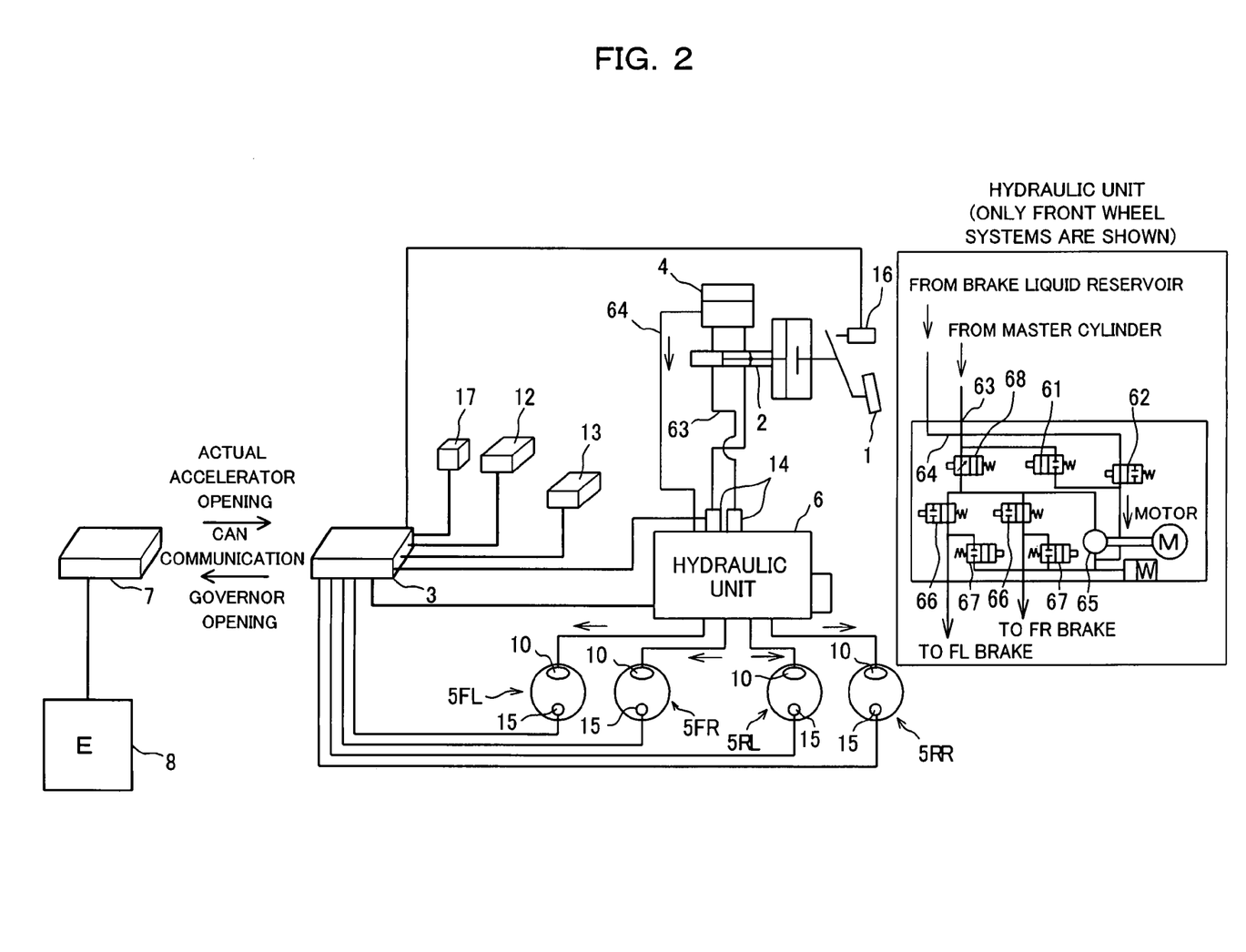
FIG. 2 is a system block diagram showing a general configuration of a braking system for a vehicle which includes the roll-over suppressing control apparatus for a vehicle according to the embodiment.

A roll-over suppressing control apparatus for a vehicle according to an embodiment of the present invention is used with such a braking system for a vehicle as shown in FIG. 2. Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to as brakes) 10 for braking wheels (front left and right wheels and rear left and right wheels) 5FL, 5FR, 5RL, 5RR in response to the state of the master cylinder 2 or in accordance with an instruction from a braking controller (brake ECU) 3. It is to be noted here that braking means is formed from a hydraulic pressure adjusting system including the master cylinder 2, hydraulic unit 6 and so forth and the wheel brakes 10 for the braking wheels and so forth.

Meanwhile, an engine ECU 7 is provided as engine output adjustment means for adjusting the output power of an engine 8 such that adjustment of the engine output power suitable for a state of the vehicle can be carried out through CAN communication of the engine ECU 7 with the brake ECU 3.

In the present embodiment, control (roll-over suppressing control) for preventing the roll rate and the lateral acceleration to act upon the vehicle from becoming excessively high thereby to suppress the roll-over (overturning) of the vehicle is carried out as behavior control for stabilizing the behavior of the vehicle. The roll-over suppressing control includes two control modes of roll-over suppressing braking control and engine output suppressing control.

The roll-over suppressing braking control is braking control wherein braking force is applied to turning outer wheels of the vehicle to suppress sudden turning of the vehicle (particularly to increase the turning radius) and slow down the vehicle thereby to reduce the centrifugal force to be generated on the vehicle to suppress the roll-over. In this instance, as parameters for deciding the degree of stability of the vehicle, both the lateral acceleration and the roll rate of the vehicle are utilized. It is to be noted that, in the present embodiment, the roll-over suppressing braking control which is based on the magnitude of the lateral acceleration is referred to as lateral acceleration control, and the roll-over suppressing braking control which is based on the magnitude of the roll rate is referred to as roll rate control. Meanwhile, the engine output suppressing control is output power control of the engine. In particular, the engine output suppressing control reduces the output power of the engine to slow down the vehicle thereby to achieve stabilization of the behavior of the vehicle. Particulars of the control modes are hereinafter described.

It is to be noted that, in the present embodiment, braking control wherein both of the roll-over suppressing controls and braking control (driver control) which is performed in accordance with the operation amount of the brake pedal 1 are integrated can be performed.

As seen in FIG. 2 (in FIG. 2, only the left and right wheel brakes for the front wheels are shown), a differential pressure valve 68 in the hydraulic unit 6 operates in the roll-over suppressing control so that a predetermined pressure difference may appear between the upstream and the downstream of the differential pressure valve 68. When the vehicle is in the behavior control mode and the brake pedal 1 is not operated, an in-line intake valve 61 is closed while an out-line intake valve 62 is opened. Consequently, the brake fluid in the brake fluid reservoir 4 is introduced through an out-line 64 and the out-line intake valve 62 into a pump 65 and is pressurized by the pump 65, and the pressure of the brake liquid is adjusted by a fluid pressure holding valve 66 and a pressure reducing valve 67 and the brake fluid of the adjusted pressure is supplied to the brakes 10 for the wheels. On the other hand, when the vehicle is in the behavior control mode and the brake pedal 1 is operated, since the in-line intake valve 61 is opened and the out-line intake valve 62 is closed, the brake fluid in the master cylinder 2 is introduced through an in-line 63 and the in-line intake valve 61 into the pump 65 and is pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels.

It is to be noted that, if the braking control (driver control) by the driver is performed upon the behavior control mode of the vehicle described above, then the pressure adjustment by the fluid pressure holding valve 66 and the pressure reducing valve 67 is performed based on pressure information of the brake fluid in the master cylinder 2 determined by a fluid pressure sensor 14. Further, the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking (driver control), the in-line intake valve 61 and the out-line intake valve 62 are closed, and the differential pressure valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, and liquid pressure holding valves 66, pressure reducing valves 67 and differential pressure valve 68 for the braking wheels of the hydraulic unit 6 having such a configuration as described above are controlled by the brake ECU 3.

Various signals are inputted to the brake ECU 3. In particular, a yaw rate signal of the vehicle body is inputted from a yaw rate sensor 12 provided on the vehicle body, and a roll rate signal (parameter value) of the vehicle body is inputted from a roll rate sensor (roll rate detection means) 13 provided on the vehicle body. Further, a wheel speed signal is inputted from a wheel speed sensor 15 for each wheel, and a brake pedal operation signal is inputted from a brake switch 16. Furthermore, a forward-backward acceleration signal and a lateral acceleration signal are inputted from a forward-backward and lateral acceleration sensor (lateral acceleration detection means) 17 provided on the vehicle body.

Figure 1:
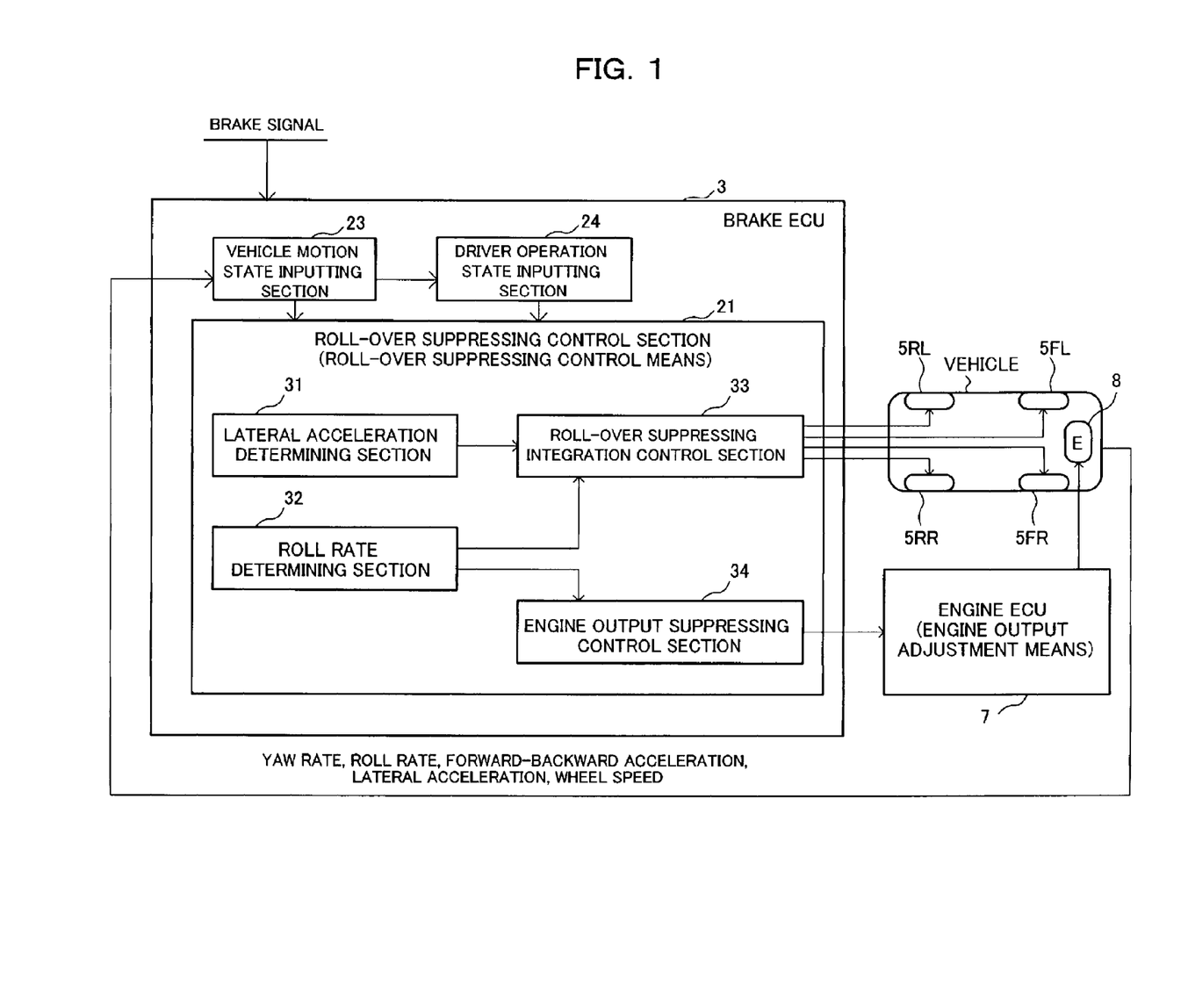
FIG. 1 is a control block diagram of a roll-over suppressing control apparatus for a vehicle according to an embodiment of the present invention.

The brake ECU 3 includes such various functional elements as seen in FIG. 1. Referring to FIG. 1, the brake ECU 3 includes a vehicle motion state inputting section 23 for receiving various kinds of information relating to an operation condition (behavior) of the driver as inputs thereto and suitably processing the input information to calculate a theoretical motion condition of the vehicle. The brake ECU 3 further includes a driver operation state inputting section 24 for receiving various kinds of information relating to an operation condition of the driver such as an accelerator operation and a brake operation as inputs thereto and suitably processing the input information. The brake ECU 3 further includes a roll-over suppressing control section (roll-over suppressing control means) 21 for carrying out control (roll-over suppressing control) for suppressing the roll-over (overturning) of the vehicle.

It is to be noted that the brake ECU 3 includes, as additional control means, an automatic slowing down control section (not shown) for arithmetically operating a turning radius upon turning of the vehicle and a coefficient of friction of the traveling load surface to automatically slow down the speed of the vehicle, a yaw moment control section (not shown) for controlling the posture of the vehicle in a turning round or restoring direction, and so forth. However, description of such other control sections is omitted herein.

Now, the components of the brake ECU 3 are described.

The vehicle motion state inputting section 23 recognizes an actual forward-backward acceleration $G_x$ generated on the vehicle body from a forward-backward acceleration signal and an actual lateral acceleration $G_y$ generated on the vehicle body from a lateral acceleration signal, both inputted from the forward-backward and lateral acceleration sensor 17 and recognizes a yaw rate $Y_r$ generated on the vehicle body from a yaw rate signal inputted from the yaw rate sensor 12, and outputs them to the roll-over suppressing control section 21. Further, the vehicle motion state inputting section 23 here calculates a vehicle body speed $V_b$. Although the vehicle body speed $V_b$ is normally calculated based on wheel speed signals from the wheel speed sensors 15, if a slip occurs with a wheel, then the vehicle motion state inputting section 23 adds a time integrated value of the actual forward-backward acceleration $G_x$ obtained from the forward-backward and lateral acceleration sensor 17 to the vehicle body speed based on the wheel speed signal till then to calculate the vehicle body speed (in this instance, the calculated vehicle body speed is an estimated vehicle body speed).

The driver operation state inputting section 24 decides whether or not the brake pedal 1 is operated from a brake pedal operation signal from the brake switch 16. Further, the operation amount $PR_{DR}$ of the brake pedal 1 by the driver is calculated based on master cylinder fluid pressure information inputted from the fluid pressure sensor 14.

The roll-over suppressing control section 21 includes a lateral acceleration determining section 31, a roll rate determining section 32, a roll-over suppressing integration control section 33, and an engine output suppressing control section 34.

Braking control by the roll-over suppressing integration control section 33 is control of applying braking force to turning outer wheels of the vehicle, and the magnitude of braking force to be applied then is arithmetically operated independently by the lateral acceleration determining section 31 and the roll rate determining section 32. Then, the roll-over suppressing integration control section 33 integrates the arithmetically operated magnitudes of braking force and uses the resulting value for the braking control. On the other hand, braking control by the engine output suppressing control section 34 is control of causing the engine ECU 7 to reduce the fuel supply amount to the engine 8 to reduce the output power of the engine 8.

If a predetermined starting condition based on the value of the roll rate is satisfied, then the roll rate determining section 32 performs control of applying braking force (braking force of a first control amount) corresponding to the magnitude of the roll rate $R_r$ to turning outer wheels (such control is hereinafter referred to as roll rate control). Then, if a predetermined ending condition is satisfied, then the roll rate determining section 32 ends the control. The braking force corresponding to the magnitude of the roll rate $R_r$ in the present control is arithmetically operated in the roll rate determining section 32.

It is to be noted that the starting condition of the roll rate control in the present embodiment is that all of conditions (1) that the vehicle body speed $V_b$ is equal to or higher than a reference value (low speed value set in advance) $V_1$, (2) that the magnitude of the lateral acceleration $G_y$ is equal to or higher than a reference value (value set in advance) $G_{yS1}$, and (3) that the magnitude of the roll rate $R_r$ is equal to or higher than a reference value (first control starting threshold value set in advance) $R_{rS}$ are satisfied. If all of the conditions are satisfied, then the roll rate control is started. The conditions described above include a turning starting condition, and if all of the conditions are satisfied, then the vehicle naturally is in a turning state. Further, in the present embodiment, the reference value $G_{yS1}$ for the lateral acceleration $G_y$ decided in the starting condition (2) is set to a very low value. In other words, the lateral acceleration $G_y$ here is included in the starting conditions not as a parameter for determining of the rolling state of the vehicle but as a parameter for determining of starting of turning of the vehicle. Accordingly, the starting conditions of the roll rate control are actually based on the value of the roll rate $R_r$.

In the roll rate control, braking force is applied to turning outer wheels. The magnitude of the braking force to be applied at this time is set based on a correspondence map in which it is set as a value corresponding to the magnitude of the roll rate $R_r$. It is to be noted that, in the present embodiment, an increasing/decreasing pressure gradient $PR_{RR}$ of the brake fluid pressure controlled by the hydraulic unit 6 is set as a braking control amount (first control amount) of a value corresponding to the magnitude of the roll rate $R_r$.

On the other hand, the ending condition of the roll rate control is that any one of conditions (1) that the vehicle body speed $V_b$ is lower than a reference value (low speed value set in advance) $V_2$ ($V_2<V_1$), (2) that the turning direction is changed over, and (3) that the magnitude of the roll rate $R_r$ is lower than a reference value (control ending threshold value set in advance) $R_{rE}$ ($R_{rE}<R_{rS}$) is satisfied. If any one of the conditions is satisfied, then the roll rate control is ended. It is to be noted that, as regards the changing over of the turning direction, when the sign of the yaw rate $Y_r$ exhibits a reversal, it is decided that the turning direction has been changed over.

In this manner, the roll rate determining section 32 starts the roll rate control when the roll rate control starting condition is satisfied, and ends the roll rate control when the roll rate control ending condition is satisfied. In other words, a first control carrying out condition is that the roll rate starting condition is satisfied and the roll rate ending condition is not satisfied.

The lateral acceleration determining section 31 performs, if a predetermined starting condition with regard to the lateral acceleration (second control starting condition) is satisfied, control of applying braking force (braking force of a second control amount) according to the magnitude of the lateral acceleration $G_y$ to turning outer wheels (such control is hereinafter referred to as lateral acceleration control). However, if a predetermined ending condition is satisfied, then the lateral acceleration determining section 31 ends the control. The braking force according to the magnitude of the lateral acceleration $G_y$ in the present control is arithmetically operated in the lateral acceleration determining section 31.

The starting condition of the lateral acceleration control is that all of conditions (1) that the vehicle body speed $V_b$ is equal to or higher than the reference value $V_1$ and (2) that the magnitude of the lateral acceleration $G_y$ is equal to or higher than a reference value (second control starting threshold value set in advance) $G_{yS2}$ ($G_{yS1}<G_{yS2}$) are satisfied. If all of the conditions are satisfied, then the lateral acceleration determining section 31 starts the lateral acceleration control. The conditions include a turning starting condition of the vehicle, and when all of the conditions are satisfied, naturally the vehicle is in a turning state.

It is to be noted that the reference value $G_{yS2}$ for the lateral acceleration in the starting condition described above is set to a value higher than the reference value $G_{yS1}$ for the lateral acceleration in the starting condition of the roll rate control described above. In particular, if attention is paid only to the lateral acceleration, then the starting condition of the lateral acceleration control is set severer than the starting condition of the roll rate control, and when a lateral acceleration higher than a lateral acceleration which is generated on a vehicle which is in such a turning situation that the roll rate control is performed (in other words, a lateral acceleration having a higher degree of roll-over), the lateral acceleration control is performed.

In the lateral acceleration control, braking force is applied to turning outer wheels. The magnitude of the braking force to be applied in this instance is set based on a correspondence map in which it is set as a value corresponding to the magnitude of the lateral acceleration $G_y$. It is to be noted that, in the present embodiment, an increasing/decreasing pressure gradient $PR_{LA}$ of the brake hydraulic pressure controlled by the hydraulic unit 6 is set as a braking control amount (second control amount) of a value corresponding to the magnitude of the lateral acceleration $G_y$.

On the other hand, the ending condition of the lateral acceleration control is that any one of the conditions (1) that the vehicle body speed $V_b$ is lower than the reference value $V_2$, (2) that the turning direction is changed over, and (3) that the magnitude of the lateral acceleration $G_y$ is lower than a reference value $G_{yE2}$ ($G_{yE2}<G_{yS2}$) is satisfied. If anyone of the conditions is satisfied, then the lateral acceleration control is ended. It is to be noted that, as regards the changing over of the turning direction also in this instance, when the sign of the yaw rate $Y_r$ exhibits a reversal, it is decided that the turning direction has been changed over. It is to be noted here that, for the vehicle body speeds for decision regarding the starting condition and the ending condition of the lateral acceleration control, the values $V_1$ and $V_2$ common to those of the vehicle body speeds for decision regarding the starting condition and the ending condition of the roll rate control are used. However, different values may otherwise be used.

In this manner, the lateral acceleration determining section 31 starts the lateral acceleration control when the lateral acceleration control starting condition is satisfied, and ends the lateral acceleration control when the lateral acceleration control ending condition is satisfied. Thus, a second control carrying out condition is that the lateral acceleration control starting condition is satisfied and the lateral acceleration control ending condition is not satisfied.

The roll-over suppressing integration control section 33 has a function of integrating the control by the lateral acceleration determining section 31 and the control by the roll rate determining section 32. In other words, when both of the lateral acceleration control by the lateral acceleration determining section 31 and the roll rate control by the roll rate determining section 32 are to be carried out, the roll-over suppressing integration control section 33 performs arithmetic operation for integrating the braking force values arithmetically operated by the individual control section.

In particular, the increasing/decreasing pressure gradient (first control amount) $PR_{RR}$ set by the roll rate determining section 32 and the increasing/decreasing pressure gradient (second control amount) $PR_{LA}$ set by the lateral acceleration determining section 31 are multiplied by a roll rate gain (roll rate-corresponding gain) $K_{RR}$ and a lateral acceleration gain (lateral acceleration-corresponding gain) $K_{LA}$, and the sum of the products is set as a controlling increasing/decreasing pressure gradient $PR_{rop}$ and used for the control. Here, the roll rate gain $K_{RR}$ and the lateral acceleration gain $K_{LA}$ are given as functions of the roll rate $R_r$ and the lateral acceleration $G_y$ as seen in FIGS. 4(a) and 4(b), respectively.

Figure 4A:
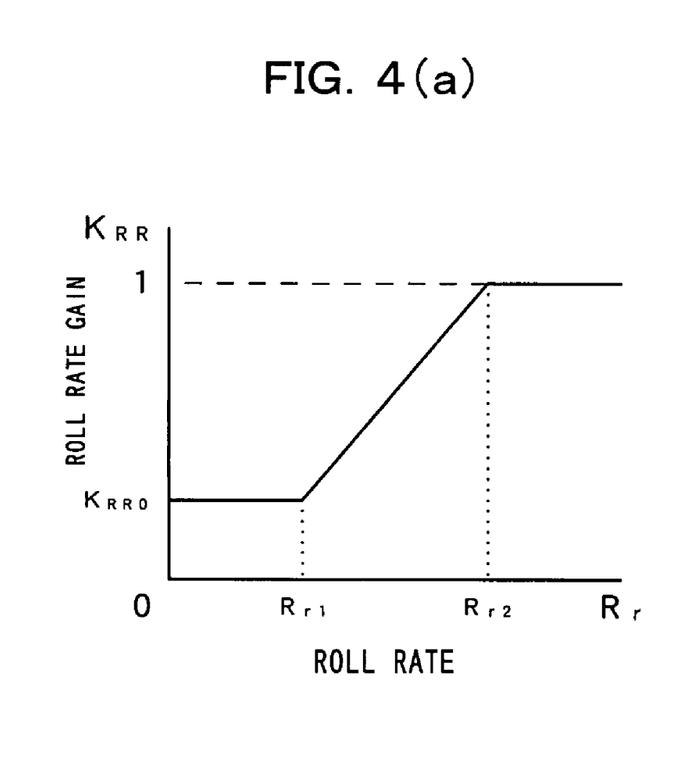
FIG. 4(a) is a map illustrating a correction characteristic of a braking control amount of roll rate control in integrated control of roll rate control and lateral acceleration control by the roll-over suppressing control apparatus for a vehicle according to the embodiment.

As seen in FIG. 4(a), the roll rate gain $K_{RR}$ has a fixed value $K_{RR0}$ where the magnitude of the roll rate $R_r$ is lower than a predetermined value (first predetermined value) $R_{r1}$, and increases, where the magnitude of the roll rate $R_r$ is equal to or higher than the predetermined value $R_{r1}$ but lower than another predetermined value (second predetermined value) $R_{r2}$, as the magnitude of the roll rate $R_r$ increases, but has the value 1 where the magnitude of the roll rate $R_r$ is equal to or higher than the predetermined value $R_{r2}$ (where $R_{r1}<R_{r2}$).

Figure 4B:
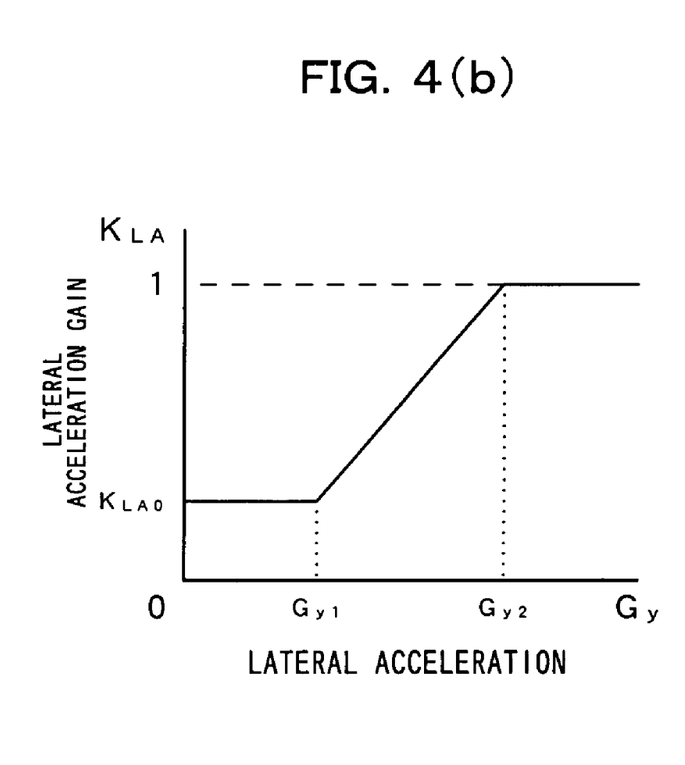
FIG. 4(b) is a map illustrating a correction characteristic of a braking control amount of lateral acceleration control in the integrated control of the roll rate control and the lateral acceleration control by the roll-over suppressing control apparatus for a vehicle according to the embodiment.

Meanwhile, as seen in FIG. 4(b), the lateral acceleration gain $K_{LA}$ has a fixed value $K_{LA0}$ where the magnitude of the lateral acceleration $G_y$ is lower than a predetermined value (third predetermined value) $G_{y1}$, and increases, where the magnitude of the lateral acceleration $G_y$ is equal to or higher than the predetermined value $G_{y1}$ but lower than another predetermined value (fourth predetermined value) $G_{y2}$, as the magnitude of the lateral acceleration $G_y$ increases, but has the value 1 where the magnitude of the lateral acceleration $G_y$ is equal to or higher than the predetermined value $G_{y2}$ (where $G_{y1}<G_{y2}$).

In particular, in integration control of the increasing/decreasing pressure gradient in the roll rate control and the increasing/decreasing pressure gradient in the lateral acceleration control, when the magnitude of the roll rate $R_r$ is equal to or higher than the predetermined value $R_{r2}$, the roll-over suppressing integration control section 33 sets the roll rate gain $K_{RR}$ to1 thereby to assure an increasing/decreasing pressure gradient essentially required for the roll rate control, but when the magnitude of the lateral acceleration $G_y$ is equal to or higher than the predetermined value $G_{y2}$, the roll-over suppressing integration control section 33 sets the lateral acceleration gain $K_{LA}$ to 1 thereby to secure an increasing/decreasing pressure gradient sufficient for the lateral acceleration control. Then, the sum of the increasing/decreasing pressure gradients becomes a controlling increasing/decreasing pressure gradient $PR_{rop}$ with which both of the roll rate control and the lateral acceleration control can be performed with certainty.

On the other hand, when the magnitude of the roll rate $R_r$ is equal to or higher than the predetermined value $R_{r1}$ but lower than the predetermined value $R_{r2}$, the roll gate gain $K_{RR}$ is set to a value which increases in response to increase of the magnitude of the roll rate $R_r$ but is equal to or smaller than 1, and when the magnitude of the lateral acceleration $G_y$ is equal to or higher than the predetermined value $G_{y1}$ but lower than the predetermined value $G_{y2}$, the lateral acceleration gain $K_{LA}$ is set to a value which increases in response to increase of the magnitude of the lateral acceleration $G_y$ but is equal to or smaller than 1 so that the controlling increasing/decreasing pressure gradient $PR_{rop}$ may not become excessively high. In particular, if the sum of the increasing/decreasing pressure gradient in the roll rate control and the increasing/decreasing pressure gradient in the lateral acceleration control is used as the controlling increasing/decreasing pressure gradient, then since the tendency that the braking amount becomes excessively great increases as the magnitude of the roll rate $R_r$ or the magnitude of the lateral acceleration $G_y$ decreases. Therefore, the controlling increasing/decreasing pressure gradient $PR_{rop}$ to be arithmetically operated is prevented from making the braking amount excessively great by decreasing the roll rate gain $K_{RR}$ as the magnitude of the roll rate $R_r$ decreases and decreasing the lateral acceleration gain $K_{LA}$ as the magnitude of the lateral acceleration $G_y$ decreases.

Furthermore, by setting the roll rate gain $K_{RR}$ to the fixed value $K_{RR0}$ when the magnitude of the roll rate $R_r$ is lower than the predetermined value $R_{r1}$ and setting the lateral acceleration gain $K_{LA}$ to the fixed value $K_{LA0}$ when the magnitude of the lateral acceleration $G_y$ is lower than the predetermined value $G_{y1}$, the controlling increasing/decreasing pressure gradient $PR_{rop}$ to be calculated secures a minimum increasing/decreasing pressure gradient necessary for both of the roll rate control and the lateral acceleration control.

The engine output suppressing control section 34 decides whether or not the engine output suppressing control of suppressing the output power of the engine 8 to slow down the vehicle should be started or ended. Such decisions are made based on whether or not a predetermined starting condition and a predetermined ending condition are satisfied, respectively. If the predetermined starting condition is satisfied, then the engine ECU 7 carries out the engine output suppressing control. On the other hand, if the predetermined ending condition is satisfied, then the engine ECU 7 ends the engine output suppressing control.

The starting condition of the engine output suppressing control is that all of the conditions (1) that the vehicle body speed $V_b$ is equal to or higher than the reference value (low speed value set in advance) $V_1$, (2) that the magnitude of the lateral acceleration $G_y$ is equal to or higher than reference value (value set in advance) $G_{y,S1}$, and (3) that the magnitude of the roll rate $R_r$ is equal to or higher than the reference value (control starting threshold value set in advance) $R_{rS}$ are satisfied. If all of the conditions are satisfied, then the engine output suppressing control section 34 starts the engine output suppressing control to reduce the fuel supply amount to the engine 8 to suppress the engine output power (that is, to reduce the output power of the engine).

On the other hand, the ending condition of the engine output suppressing control is that any one of the conditions (1) that the vehicle body speed $V_b$ is lower than the reference value (low speed value set in advance) $V_2$ (where $V_2<V_1$), (2) that the turning direction is changed over, and (3) that the magnitude of the roll rate $R_r$ is lower than the reference value (control ending threshold value set in advance) $R_{rE}$ ($R_{rE}<R_{rS}$) is satisfied. If any one of the conditions is satisfied, then the engine output suppressing control is ended.

The starting condition and the ending condition are same as the starting condition and the ending condition for the roll rate control by the roll rate determining section 32. In particular, when the starting condition for the roll rate control by the roll rate determining section 32 is satisfied, also the starting condition of the engine output suppressing control by the engine output suppressing control section 34 is satisfied, and when the ending condition for the roll rate control is satisfied, also the ending condition for the engine output suppressing control is satisfied. Accordingly, the roll rate control and the engine output suppressing control are carried out at the same time.

Figure 3:
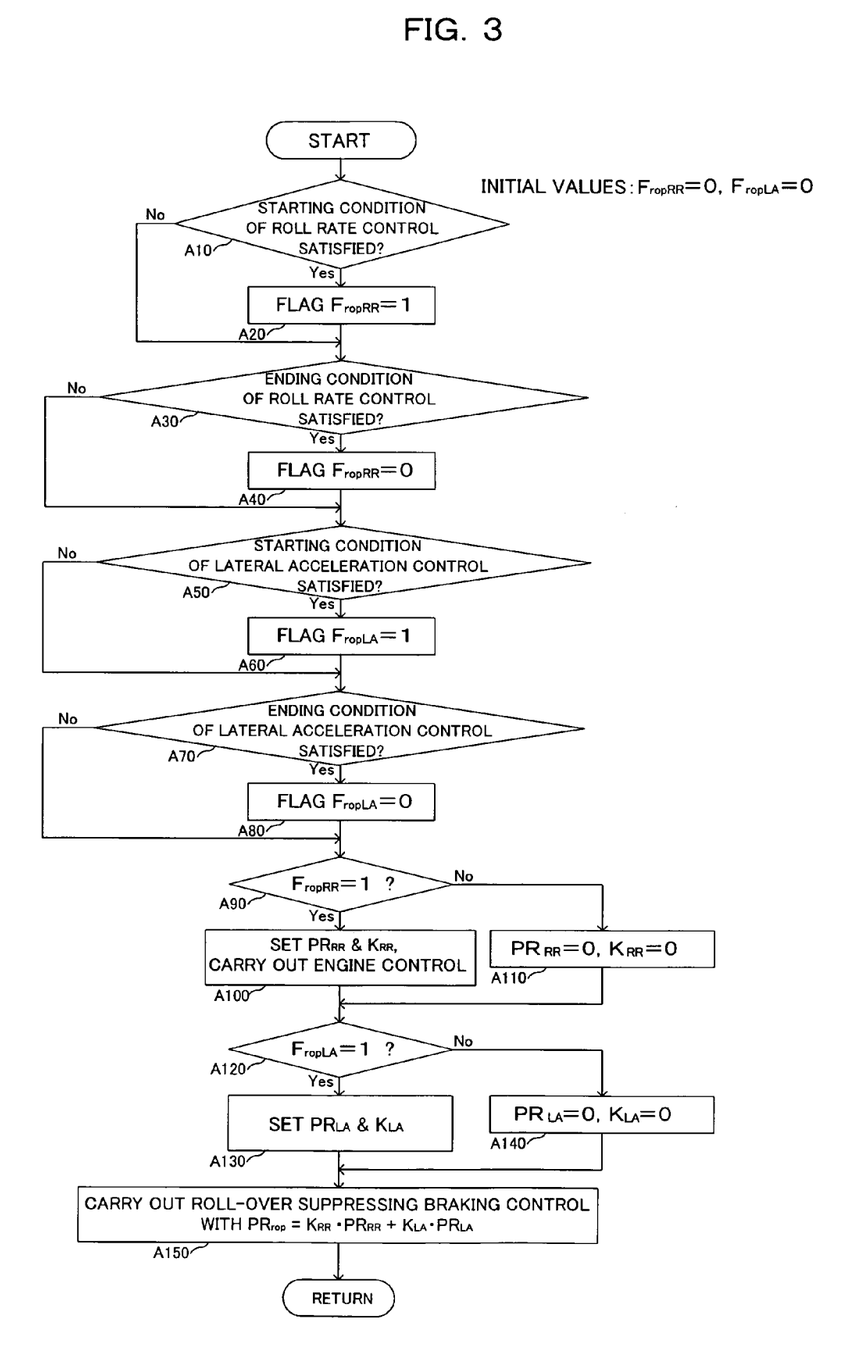
FIG. 3 is a flow chart illustrating roll-over suppression control by the roll-over suppressing control apparatus for a vehicle according to the embodiment.

Since the roll-over suppressing control apparatus for a vehicle according to the embodiment of the present invention has such a configuration as described above, control is carried out, for example, in such a manner as illustrated in FIG. 3.

First at step A10, the roll rate determining section 32 decides whether or not the starting condition of the roll rate control in the roll-over suppressing control is satisfied. If the starting condition of the roll rate control is satisfied, then the processing advances to step A20, at which a roll rate control flag $F_{ropRR}$ is set to 1, whereafter the processing advances to step A30. On the other hand, if the starting condition of the roll rate control is not satisfied at step A10, then the processing advances to step A30 immediately. It is to be noted that the roll rate control flag $F_{ropRR}$ is a flag representative of whether or not the roll rate control is carried out by the present apparatus at that time, and when the roll rate control is carried out, the roll rate control flag $F_{ropRR}$ is set to $F_{ropRR}=1$, but when the roll rate control is not carried out, the roll rate control flag $F_{ropRR}$ is set to $F_{ropRR}=0$ (the initial value is $F_{ropRR}=0$).

At next step A30, the roll rate determining section 32 decides whether or not the ending condition of the roll rate control is satisfied. If the ending condition of the roll rate control is satisfied, then the processing advances to step A40, at which the roll rate control flag $F_{ropRR}$ is set to 0, whereafter the processing advances to step A50. On the other hand, if the ending condition of the roll rate control is not satisfied at step A30, then the processing advances to step A50 immediately.

At next step A50, the lateral acceleration determining section 31 decides whether or not the starting condition of the lateral acceleration control in the roll-over suppressing braking control is satisfied. If the starting condition of the lateral acceleration control is satisfied, then the processing advances to step A60, at which a lateral acceleration control flag $F_{ropLA}$ is set to 1, whereafter the processing advances to step A70. On the other hand, if the starting condition of the lateral acceleration control is not satisfied at step A50, then the processing advances to step A70 immediately. It is to be noted that the lateral acceleration control flag $F_{ropLA}$ is a flag representing whether or not the lateral acceleration control is carried out by the present apparatus at that time, and if the lateral acceleration control is carried out, then the lateral acceleration control flag $F_{ropLA}$ is set to $F_{ropLA}=1$, but if the lateral acceleration control is not carried out, then the lateral acceleration control flag $F_{ropLA}$ is set to $F_{ropLA}=0$ (the initial value is $P_{ropLA}=0$).

At next step A70, the lateral acceleration determining section 31 decides whether or not the ending condition of the lateral acceleration control is satisfied. If the ending condition of the lateral acceleration control is satisfied, then the processing advances to step A80, at which the lateral acceleration control flag $F_{ropLA}$ is set to 0, whereafter the processing advances to step A90. On the other hand, if the ending condition of the lateral acceleration control is not satisfied at step A70, then the processing advances to step A90 immediately.

In the flow at and after step A90, braking control is carried out based on the values of the roll rate control flag $F_{ropRR}$ and the lateral acceleration control flag $F_{ropLA}$. First at step A90, it is decided whether or not the roll rate control flag $F_{ropRR}$ is 1. If $F_{ropRR}=1$, then the processing advances to step A100, at which the roll rate determining section 32 sets the increasing/decreasing pressure gradient $PR_{RR}$ for the brake hydraulic pressure, which is controlled by the hydraulic unit 6, as a braking control amount (first control amount) of a value corresponding to the magnitude of the roll rate $R_r$. Further, the roll-over suppressing integration control section 33 refers to the correspondence map illustrated in FIG. 4(a) to set a roll rate gain $K_{RR}$ based on the magnitude of the roll rate $R_r$. In short, a particular braking control amount of the roll rate control is set here.

Simultaneously, engine output suppressing control of reducing the output power of the engine 8 is carried out. In particular, since the starting condition and the ending condition of the engine output suppressing control are same as the starting condition and the ending condition of the roll rate control, respectively, when the roll rate control flag $F_{ropRR}$ is 1, the condition for carrying out the engine output suppressing control is satisfied, and therefore, the engine output suppression control is carried out here. Then, the processing advances to step A120.

On the other hand, if $F_{ropRR}=0$ at step A90, then the processing advances to step A110, at which the increasing/decreasing pressure gradient $PR_{RR}$ and the roll rate gain $K_{RR}$ are set to $PR_{RR}=0$ and $K_{RR}=0$, respectively, whereafter the processing advances to step A120. In short, the particular braking control amount for the roll rate control is set to 0 (in other words, the roll rate control is not carried out).

At step A120, it is decided whether or not the lateral acceleration control flag $F_{ropLA}$ is 1. If $F_{ropLA}=1$, then the processing advances to step A130, at which the lateral acceleration determining section 31 sets the increasing/decreasing pressure gradient $PR_{LA}$ of the brake hydraulic liquid, which is controlled by the hydraulic unit 6, as a braking control amount (second control amount) of a value corresponding to the magnitude of the lateral acceleration $G_y$. Further, the roll-over suppressing integration control section 33 refers to the correspondence map shown in FIG. 4(b) to set the lateral acceleration gain $K_{LA}$ based on the magnitude of the lateral acceleration $G_y$. In short, a particular braking control amount for the lateral acceleration control is set here, and thereafter, the processing advances to step A150.

On the other hand, if $F_{ropLA}=0$ at step A120, then the processing advances to step A140, at which the increasing/decreasing pressure gradient $PR_{LA}$ and the lateral acceleration gain $K_{LA}$ are set to $PR_{LA}=0$ and $K_{LA}=0$, respectively, whereafter the processing advances to step A150. In short, the particular braking control amount for the lateral acceleration control is set to 0 (in other words, the lateral acceleration control is not carried out).

Then, at step A150, a controlling increasing/decreasing pressure gradient is set in accordance with the following expression:

$$PR_{rop}=K_{RR} \cdot PR_{RR}+K_{LA} \cdot PR_{LA} \tag{1}$$

where $PR_{RR}$: increasing/decreasing pressure gradient by the roll rate control, $PR_{LA}$: increasing/decreasing pressure gradient by the lateral acceleration control, $K_{RR}$: roll rate gain ($0 \leq K_{RR} \leq 1$), and $K_{LA}$: lateral acceleration gain ($0 \leq K_{LA} \leq 1$).

In particular, the controlling increasing/decreasing pressure gradient is calculated by weighting addition of the increasing/decreasing pressure gradients by the roll rate control and the lateral acceleration control with the roll rate gain and the lateral acceleration gain corresponding to the magnitudes of the roll rate $R_r$ and the lateral acceleration $G_y$. Then, actual braking control is carried out based on the thus set controlling increasing/decreasing pressure gradient $PR_{rop}$. Thereafter, the flow is ended.

In this manner, in the present apparatus, the engine output suppressing control is carried out in the same condition as in the roll rate control. Further, the roll-over suppressing braking control is performed using a control amount obtained by weighting addition of control amounts calculated in both of the roll rate control and the lateral acceleration control.

Figure 5A:
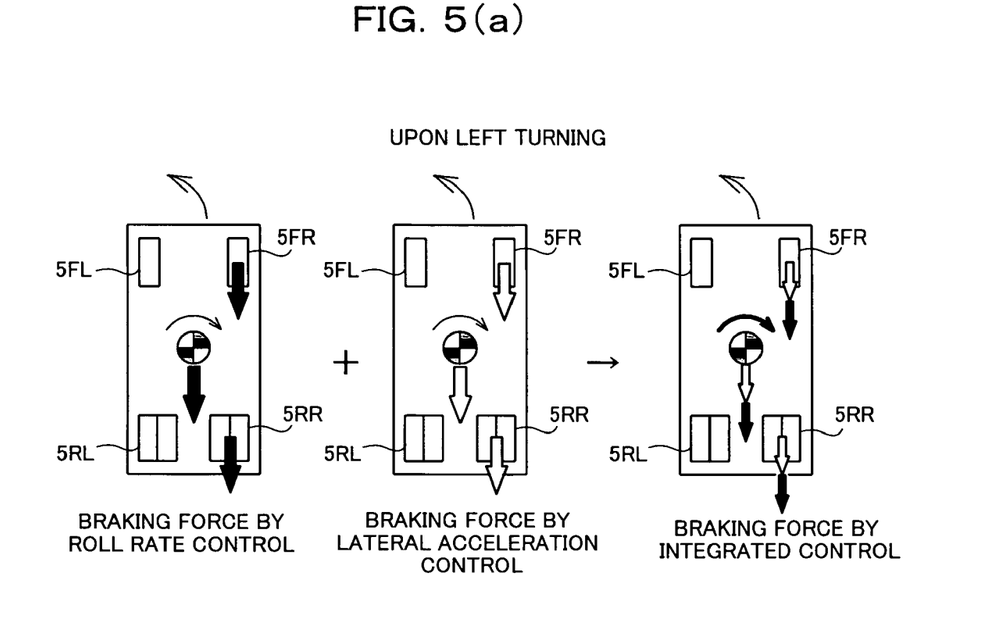
FIG. 5(a) is a schematic view illustrating braking force to be applied to a vehicle, which includes a roll-over suppressing control apparatus for a vehicle of the present invention, when the vehicle turns in the leftward direction.

In the present embodiment, upon braking control in the roll-over suppressing control, the braking control amount set in such a manner as described above is applied as braking force to turning outer wheels. For example, as seen in FIGS. 5(a) and 5(b), while the vehicle is turning in the leftward direction, the braking force is applied to the right front wheel 5FR and the right rear wheel 5RR which are turning outer wheels, but while the vehicle is turning in the rightward direction, the braking force is applied to the left front wheel 5FL and the left rear wheel 5RL.

Where the roll rate control and the lateral acceleration control are carried out when the vehicle turns in the leftward direction, the braking force to be applied to the turning outer wheels of the vehicle by the roll rate control and the braking force to be applied to the turning outer wheels of the vehicle by the lateral acceleration control are weighted added and used for braking control as seen in FIG. 5(a). At this time, the braking force applied to the right front wheel 5FR and the right rear wheel 5RR generates a yaw moment in the rightward turning direction on the vehicle. Such yaw moment in the rightward turning direction acts to increase the turning radius of the vehicle in the leftward turning direction (that is, provides an understeer tendency to the steering characteristic of the vehicle so that the traveling path may be swollen to the turning outer side), and the roll angle in the rightward falling direction generated on the vehicle is suppressed. Further, when the vehicle is turned in the leftward direction, the ground contacting pressure of the left front wheel 5FL and the left rear wheel 5RL which are turning inner wheels decreases, and particularly in a situation wherein roll-over suppressing control is required, the tires sometimes do not contact with the road surface. Meanwhile, since the ground contacting pressure of the right front wheel 5FR and the right rear wheel 5RR which are turning outer wheels is in an increasing tendency, by applying braking force to the right front wheel 5FR and the right rear wheel 5RR, slowing down of the vehicle body speed $V_b$ can be achieved efficiently and rolling of the vehicle in the rightward falling direction can be suppressed effectively.

Figure 5B:
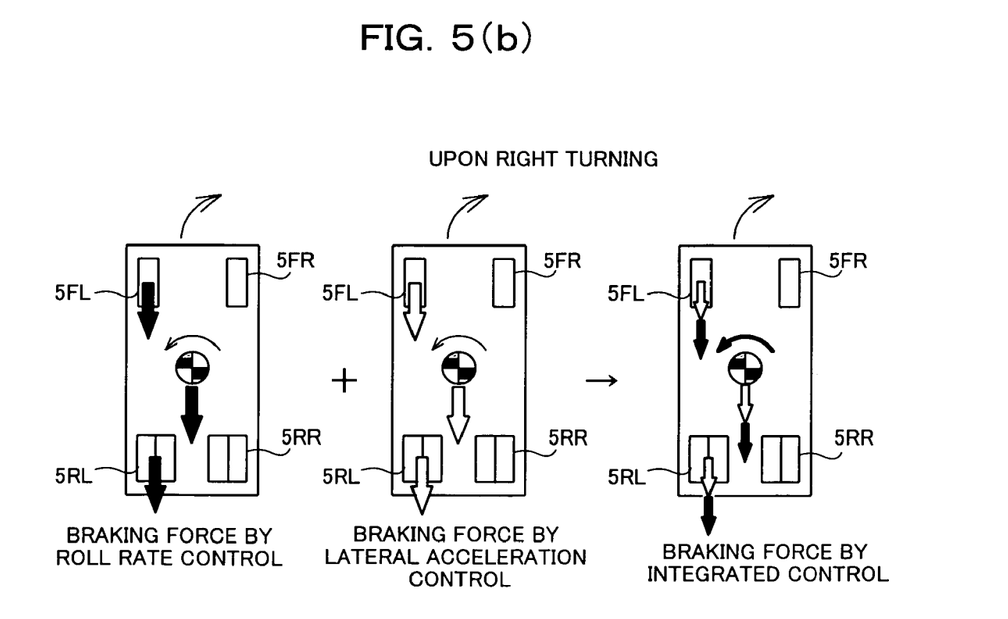
FIG. 5(b) is a schematic view illustrating braking force to be applied to a vehicle, which includes a roll-over suppressing control apparatus for a vehicle of the present invention, when the vehicle turns in the rightward direction.

Similarly, where the roll rate control and the lateral acceleration control are carried out when the vehicle turns in the rightward direction, as shown FIG. 5(b), the braking force to be applied to the turning outer wheels of the vehicle by the roll rate control and the braking force to be applied to the turning outer wheels of the vehicle by the lateral acceleration control are weighted added and used for braking control. At this time, the braking force applied to the left front wheel 5FL and the left rear wheel 5RL generates a yaw moment in the leftward turning direction on the vehicle. Such yaw moment in the leftward turning direction acts to increase the turning radius of the vehicle in the rightward direction (that is, provides an understeer tendency to the steering characteristic of the vehicle so that the traveling path may be swollen to the turning outer side), and the roll angle in the leftward falling direction generated on the vehicle is suppressed. Further, by applying braking force to the left front wheel 5FL and the left rear wheel 5RL which are turning outer wheels, slowing down of the vehicle body speed $V_b$ can be achieved efficiently and rolling of the vehicle in the leftward falling direction can be suppressed effectively.

If notice is taken of the engine output suppressing control, when the roll-over suppressing braking control of the roll rate control upon turning of the vehicle is carried out, also the engine output suppressing control is carried out simultaneously. However, when only the rollover suppressing braking control of the lateral acceleration control is carried out, the engine output suppressing control is not carried out.

Figures 6A, 6B:
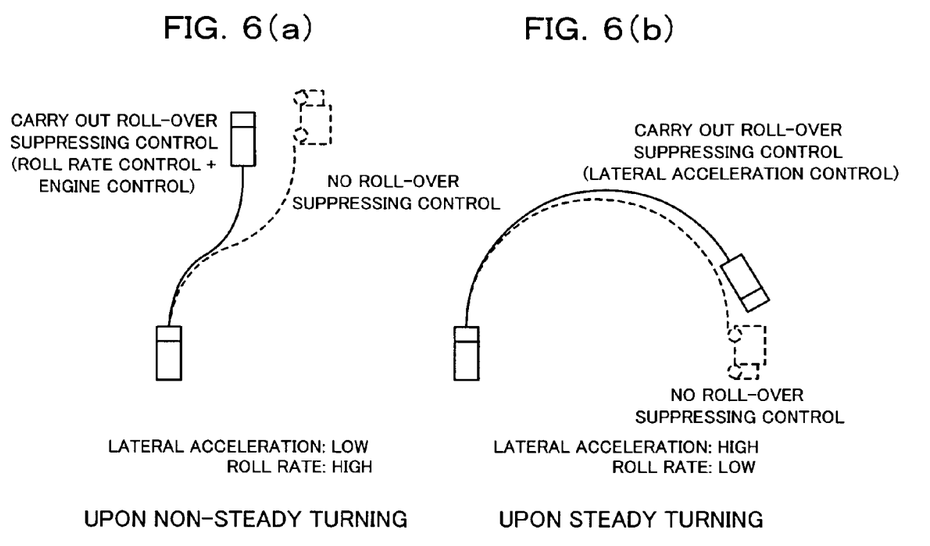
FIGS. 6(a) and 6(b) are schematic views illustrating behaviors upon turning of a vehicle which includes a roll-over suppressing control apparatus for a vehicle of the present invention.

For example, if non-steady (transient) turning upon lane change, emergency avoiding steering or the like wherein the turning direction is changed over suddenly is performed as seen in FIG. 6(a), then a high roll rate appears while the lateral acceleration is low. Consequently, the roll rate control is carried out. However, according to the present embodiment, since the engine output suppression control is carried out simultaneously with the roll rate control, sufficient slowing down can be achieved, and the roll-over can be suppressed efficiently. Further, upon such non-steady turning as described above, since control of the vehicle by the driver is not easy, the turning movement of the vehicle can be stabilized by the control of suppressing the engine output power (that is, the engine output power is reduced).

On the other hand, if steady turning wherein turning in the same direction continues as seen in FIG. 6(b) is performed, then a high lateral acceleration is always generated while the roll rate is low. Consequently, the lateral acceleration control is carried out. However, since, if the roll rate control is not carried out, then the engine output suppressing control is not carried out either, the vehicle is not slowed down excessively. Further, upon such steady turning as described above, since control of the vehicle by the driver is comparatively easy, where the engine output suppressing control is not performed, an intention of the driver to accelerate the vehicle or maintain the vehicle speed can be reflected readily and the driving feeling can be enhanced.

In this manner, according to the present roll-over suppressing control apparatus, in the roll-over suppressing braking controls, where both of the roll rate control and the lateral acceleration control are carried out, since a controlling increasing/decreasing pressure gradient obtained by weighting increasing/decreasing pressure gradients necessary for the controls with the magnitudes of the roll rate and the lateral acceleration and then adding the weighted increasing/decreasing pressure gradients is used for the control, the roll rate gain and the lateral acceleration gain are set to lower values as the magnitudes of the roll rate and the lateral acceleration decrease. Consequently, the controlling increasing/decreasing pressure gradient does not become excessively great and the stability of the vehicle can be secured. On the other hand, as the magnitudes of the roll rate and the lateral acceleration decrease, the roll rate gain and the lateral acceleration gain are set to higher values, and a controlling increasing/decreasing pressure gradient suitable for the magnitudes of the roll rate and the lateral acceleration can be secured. Consequently, both of the roll rate control and the lateral acceleration control can be carried out effectively.

Further, since, upon calculation of the increasing/decreasing pressure gradient, a gain of a fixed value is secured even where the roll rate or the lateral acceleration is low, an increasing/decreasing pressure gradient at least necessary for both of the roll rate control and the lateral acceleration control can be secured.

On the other hand, where the magnitude of the roll rate or the lateral acceleration is great, since the gain is set to 1, when the magnitude of the roll rate is great, an increasing/decreasing pressure gradient sufficient for the roll rate control is secured, but when the magnitude of the lateral acceleration is great, an increasing/decreasing pressure gradient sufficient for the lateral acceleration control is secured. Consequently, an increasing/decreasing pressure gradient with which both of the roll rate control and the lateral acceleration control can be performed can be secured with certainty.

Further, braking control by a necessary and sufficient can be executed by the settings of the roll rate gain and the lateral acceleration gain shown FIGS. 4(a) and 4(b).

The present invention is not limited to the embodiment specifically described above, and variations and modifications can be made without departing from the scope of the present invention.

For example, while, in the embodiment described above, upon behavior control of the vehicle, pressure adjustment of the fluid pressure holding valve 66 and the pressure reducing valve 67 is performed based on pressure information of the brake fluid in the master cylinder 2 detected by the fluid pressure sensor 14, the roll-over suppressing control apparatus can be configured otherwise such that control is performed with a sum value of the braking control amount in the behavior control mode and the braking control amount according to the operation amount of the brake pedal, or weighted summing is performed for them.

Further, while, in the embodiment described above, the increasing/decreasing pressure gradient $PR_{RR}$ and the increasing/decreasing pressure gradient $PR_{LA}$ are set to values corresponding to the roll rate $R_r$ and the lateral acceleration $G_y$ based on a correspondence map set in advance, the roll-over suppressing control apparatus may otherwise be configured such that they are set, for example, by PID control or set by some other logics.

Further, for the suppressing amount of the engine output power in the engine output suppressing control in the embodiment described above, a suppressing reference amount set in advance may be used or a value corresponding to a steering characteristic or an operation state of the vehicle may be used.

What is claimed is:

1. A roll-over suppressing control apparatus for a vehicle, comprising:
    braking means for braking a wheel of said vehicle;
    engine output adjustment means capable of controlling output power of an engine of said vehicle;
    roll rate detection means for detecting a roll rate of said vehicle;
    lateral acceleration detection means for detecting a lateral acceleration of said vehicle; and
    roll-over suppressing control means for causing said braking means and said engine output adjustment means to apply braking force and to suppress the output power of said engine, respectively, if a first control carrying out condition based on a value of the roll rate detected by said roll rate detection means is satisfied upon turning of said vehicle and for causing said braking means to apply braking force when a second control carrying out condition based on a value of the lateral acceleration detected by said lateral acceleration detection means is satisfied upon turning of said vehicle,
    said roll-over suppressing control means controlling, when the first control carrying out condition is satisfied, said braking means so as to apply braking force of a first control amount corresponding to the value of the roll rate to said wheel and controlling said engine output adjustment means so as to suppress the output power of said engine, and controlling, when the second control carrying out condition is satisfied, said braking means so as to apply braking force of a second control amount corresponding to the value of the lateral acceleration to said wheel.

2. The roll-over suppressing control apparatus for a vehicle as claimed in claim 1, wherein said roll-over suppressing control means causes said braking means to apply braking force of a sum value of a first correction control amount obtained by multiplying a first control amount corresponding to the value of the roll rate by a roll rate-corresponding gain equal to or lower than 1 and a second correction control amount obtained by multiplying a second control amount corresponding to the value of the lateral acceleration by a lateral acceleration-corresponding gain equal to or lower than 1 to said wheel.

3. The roll-over suppressing control apparatus for a vehicle as claimed in claim 2, wherein the roll rate-corresponding gain is set so as to increase as the value of the roll rate increases, and the lateral acceleration-corresponding gain is set so as to increase as the value of the lateral acceleration increases.

4. The roll-over suppressing control apparatus for a vehicle as claimed in claim 2, wherein the roll rate-corresponding gain is set such that, when the value of the roll rate is lower than a first predetermined value, the roll rate-corresponding gain has a fixed value equal to or lower than 1, and when the value of the roll rate is equal to or higher than the first predetermined value but is lower than a second predetermined value equal to or higher than the first predetermined value, the roll rate-corresponding gain increases in response to an increase of the value of the roll rate, and when the value of the roll rate is equal to or higher than the second predetermined value, the roll rate-corresponding gain is 1, and the lateral acceleration-corresponding gain is set such that, when the value of the lateral acceleration is lower than a third predetermined value, the lateral acceleration-corresponding gain has a fixed value equal to or lower than 1, and when the value of the lateral acceleration is equal to or higher than the third predetermined value but is lower than a fourth predetermined value equal to or higher than the third predetermined value, the lateral acceleration-corresponding gain increases in response to an increase of the value of the lateral acceleration, and when the value of the lateral acceleration is equal to or higher than the fourth predetermine value, the lateral acceleration-corresponding gain is 1.

5. The roll-over suppressing control apparatus for a vehicle as claimed in claim 3, wherein the roll rate-corresponding gain is set such that, when the value of the roll rate is lower than a first predetermined value, the roll rate-corresponding gain has a fixed value equal to or lower than 1, and when the value of the roll rate is equal to or higher than the first predetermined value but is lower than a second predetermined value equal to or higher than the first predetermined value, the roll rate-corresponding gain increases in response to an increase of the value of the roll rate, and when the value of the roll rate is equal to or higher than the second predetermined value, the roll rate-corresponding gain is 1, and the lateral acceleration-corresponding gain is set such that, when the value of the lateral acceleration is lower than a third predetermined value, the lateral acceleration-corresponding gain has a fixed value equal to or lower than 1, and when the value of the lateral acceleration is equal to or higher than the third predetermined value but is lower than a fourth predetermined value equal to or higher than the third predetermined value, the lateral acceleration-corresponding gain increases in response to an increase of the value of the lateral acceleration, and when the value of the lateral acceleration is equal to or higher than the fourth predetermine value, the lateral acceleration-corresponding gain is 1.

6. The roll-over suppressing control apparatus for a vehicle as claimed in claim 1, wherein said braking means includes right wheel brakes for braking right wheels of said vehicle and left wheel brakes for braking left wheels of said vehicle, and said roll-over suppressing control means controls, when the first control carrying out condition is satisfied, said braking means so as to apply braking force of a first control amount corresponding to the value of the roll rate to a turning outer wheel or wheels and controls said engine output adjustment means so as to suppress the output power of said engine, and controls, when the second control carrying out condition is satisfied, said braking means so as to apply braking force of a second control amount corresponding to the value of the lateral acceleration to the turning outer wheel or wheels.

7. The rollover suppressing control apparatus for a vehicle as claimed in claim 1, wherein the first control carrying out condition includes a condition that the magnitude of the value of the roll rate is equal to or higher than a first control carrying out threshold value set in advance, and the second control carrying out condition includes a condition that the magnitude of the value of the lateral acceleration is equal to or higher than a second control carrying out threshold value set in advance.

8. A roll-over suppression control apparatus for a vehicle, comprising:
    a braking device configured to brake a wheel of said vehicle;
    an engine output adjuster configured to control output power of an engine of said vehicle;
    a roll rate detector configured to detect a roll rate of said vehicle;

a lateral acceleration detector configured to detect a lateral acceleration of said vehicle; and a roll-over suppression controller configured such that said braking device and said engine output adjuster apply braking force and suppress the output power of said engine, respectively, if a first control carrying out condition based on a value of the roll rate detected by said roll rate detector is satisfied upon turning of said vehicle and such that said braking device applies braking force when a second control carrying out condition based on a value of the lateral acceleration detected by said lateral acceleration detector is satisfied upon turning of said vehicle, said roll-over suppression controller controlling, when the first control carrying out condition is satisfied, said braking device so as to apply braking force of a first control amount corresponding to the value of the roll rate to said wheel and controlling said engine output adjuster so as to suppress the output power of said engine, and controlling, when the second control carrying out condition is satisfied, said braking device so as to apply braking force of a second control amount corresponding to the value of the lateral acceleration to said wheel.

* * * * *